(12) United States Patent
Ren et al.

(10) Patent No.: US 8,537,584 B2
(45) Date of Patent: Sep. 17, 2013

(54) LATCH-OFF OF SYNCHRONOUS RECTIFICATION FOR LIGHT LOAD CONTROL

(75) Inventors: Yuancheng Ren, Hangzhou (CN); Junming Zhang, Hangzhou (CN); Lei Miao, Hangzhou (CN); Zhaoqi Mao, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 588 days.

(21) Appl. No.: 12/824,076

(22) Filed: Jun. 25, 2010

(65) Prior Publication Data

US 2011/0012538 A1  Jan. 20, 2011

(30) Foreign Application Priority Data

Jun. 26, 2009 (CN) .......................... 2009 1 0059787

(51) Int. Cl.
*H02M 7/217* (2006.01)
(52) U.S. Cl.
USPC ...................... 363/127; 363/21.06; 363/21.14
(58) Field of Classification Search
USPC .................. 363/127, 21.06, 21.12–21.18
See application file for complete search history.

(56) References Cited

U.S. PATENT DOCUMENTS

| 7,936,575 B2 * | 5/2011 | Hu | 363/21.06 |
| 2008/0247196 A1 * | 10/2008 | Strijker | 363/21.06 |

* cited by examiner

*Primary Examiner* — Harry Behm
*Assistant Examiner* — Matthew Grubb
(74) *Attorney, Agent, or Firm* — Perkins Coie LLP

(57) ABSTRACT

Disclosed is a light load control circuit and the method accordingly where the synchronous rectification is latched off when the light load condition is detected for several successive cycles.

23 Claims, 8 Drawing Sheets

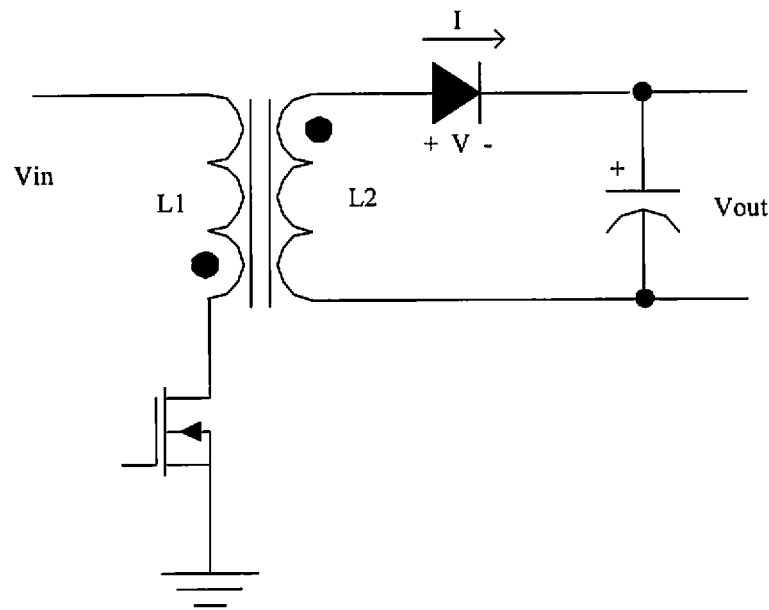
FIG. 1A *(Prior Art)*
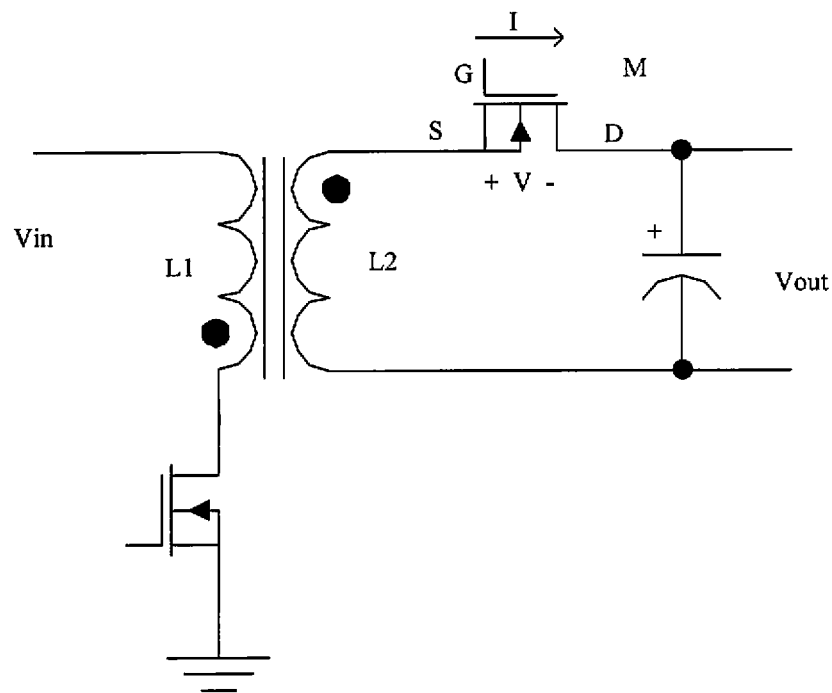
FIG. 1B *(Prior Art)*

LATCH-OFF OF SYNCHRONOUS RECTIFICATION FOR LIGHT LOAD CONTROL

CROSS-REFERENCE TO RELATED APPLICATIONS

This application claims priority to and the benefit of Chinese Patent Application No. 200910059787.8, filed on Jun. 26, 2009, which is incorporated herein by reference in its entirety.

TECHNICAL FIELD

The present invention relates to a voltage converter, and more particularly, relates to latch-off of synchronous rectification during light load mode of the voltage converter.

BACKGROUND

In general, two rectifying schemes are used in a flyback converter, non-synchronous rectification which requires a diode as seen in prior art FIG. 1A and synchronous rectification which rectifies the current through controlling on/off of a synchronous rectifier, e.g. an N-MOSFET M, as seen in prior art FIG. 1B. When a high voltage is applied to the gate of an N-MOSFET, a channel forms and the N-MOSFET is turned on with very low ON resistance. When the gate is floating or a low voltage is applied, the drain-source resistance of the MOSFET is high.

Prior art FIG. 1C shows the voltage-current characteristic for a diode (curve 12) and for a synchronous rectifier (curve 11). In practical application, the operational region of flyback power converter falls into the cross-hatched area where curve 11 is above curve 12. That is, the ON resistance of a synchronous rectifier is less than that of its body diode. Thus, synchronous rectification is widely used to save power.

However, during light load conditions, the power saved by the synchronous rectification is minor, and is even less than the power consumed by the synchronous rectification driver. For this reason, it is usual to "latch off" the synchronous rectification function to save the driver loss. For a synchronous rectifier, typically a MOSFET, the body diode is used during the non-synchronous rectification where the positive current flows through the body diode of the MOSFET, instead of the channel which appears only when the MOSFET is actuated during synchronous rectification.

A conventional synchronous rectification method and its light load control solution will be described according to FIG. 1B and prior art FIG. 2. Assume that the secondary rectifier M is under synchronous rectification. At time t0, the primary side switch P is on, the secondary rectifier M is off with low gate voltage $V_{GS}$. At that time, the drain-source voltage $V_{DS}$ is positive and the body diode of the secondary rectifier M is reverse-biased. At time t1, the primary side switch is turned off, and then the secondary rectifier M is turned on entirely with high gate voltage, current flows from the source to the drain and $V_{DS}$ is negative. As time elapses, $V_{GS}$ remains constant high, and $V_{DS}$ increases. The lighter the load, the quicker the voltage $V_{DS}$ increases. After $V_{DS}$ becomes negative at time t1, a blanking time is added. At the end of the blanking time t2, the drain-source voltage $V_{DS}$ of the rectifier M is sensed and compared to a predetermined voltage such as "zero" voltage. If $V_{DS} > 0$, a light load condition is determined and synchronous rectification is latched off into non-synchronous rectification. Then, the rectifier M is turned off with low $V_{GS}$. $V_{GS}$ keeps low (OFF state) for the following cycles.

During the non-synchronous rectification, after $V_{DS}$ changes from a positive value to a negative value, and another blanking time is added. At the end of the blanking time, $V_{DS}$ is compared with the predetermined value such as "zero" voltage. If $V_{DS} < 0$, heavy load condition is determined and synchronous rectification is active again.

However, when the load is at a "border" condition, system will shift frequently between the synchronous rectification and non-synchronous rectification. This situation lowers the efficiency of the system. The rectification mode changes based on only one cycle of light load condition, this is unreliable and is susceptible to signal spikes. Furthermore, during the light load condition, the current at the secondary side will become negative before the rectifier M is turned off, which also lowers efficiency.

BRIEF DESCRIPTION OF THE DRAWINGS

Non-limiting and non-exhaustive embodiments are described with reference to the following drawings. These drawings are not necessarily drawn to scale. The relative sizes of elements illustrated by the drawings may differ from the relative size depicted.

FIG. 1A shows a prior art non-synchronous rectifying scheme applied in a flyback converter.

FIG. 1B shows a prior art synchronous rectifying scheme applied in a flyback converter.

DETAILED DESCRIPTION

Various embodiments of the present invention are now illustrated in following figures using terms commonly employed by those skilled in the art. It will be understood that they are not intended to limit the invention to these embodiments. The invention can be practiced without one or more of the specific details, or with other methods, components, materials. In other instances, well-known structures, materials, process steps, or operations are not shown or described in detail in order not to obscure aspect of the invention.

Figure 1C:
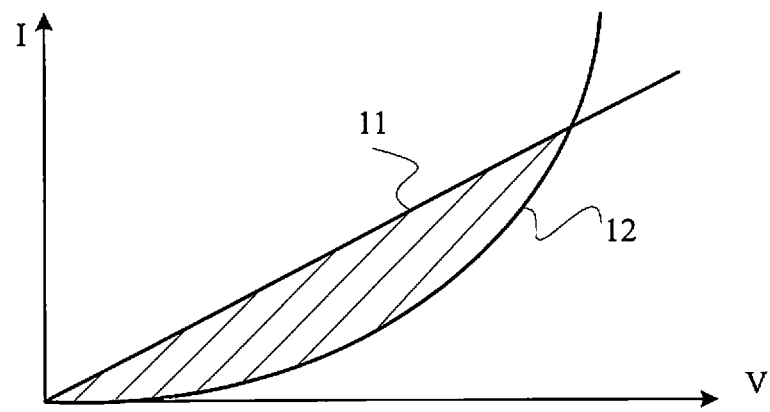
FIG. 1C shows a prior art voltage-current characteristics of a diode (curve 12) and a synchronous rectifier (curve 11).
Figure 3:
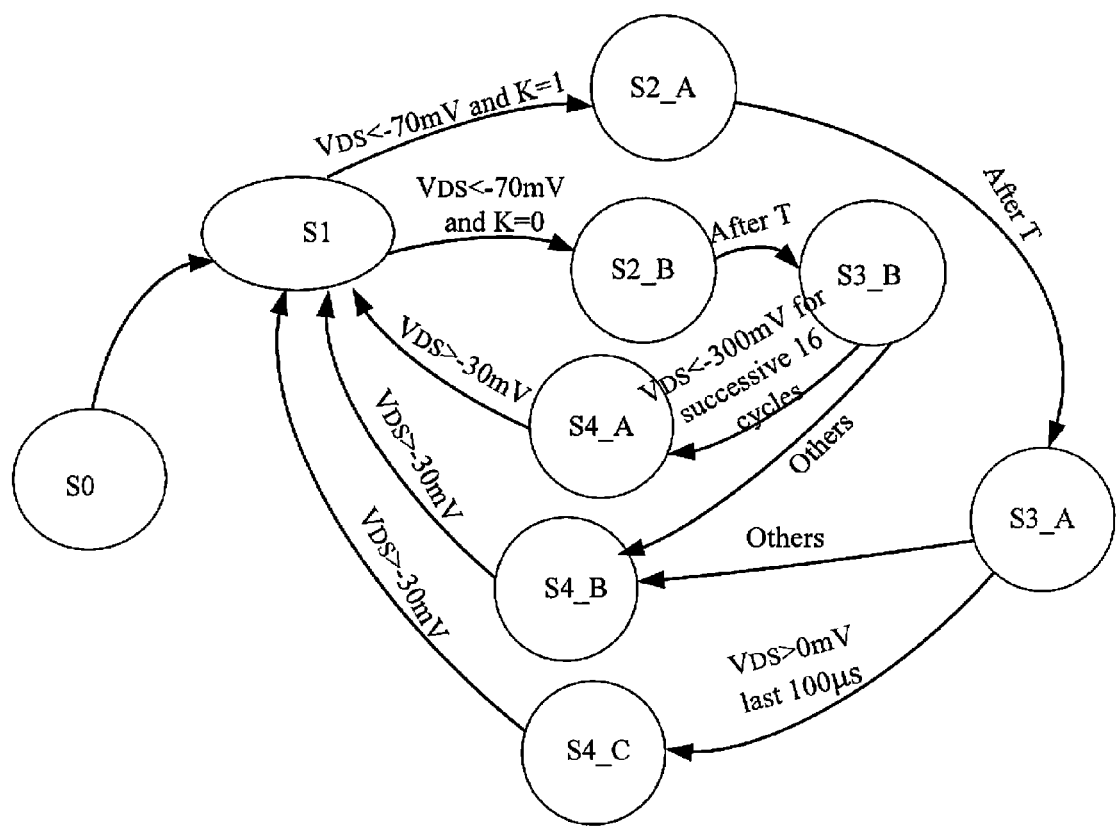
FIG. 3 shows a state diagram for a light load control method of one disclosed embodiment.

FIG. 3 shows a state diagram of a light load control method. In this control method, the drain-source voltage $V_{DS}$ of a FET is sensed to judge the load condition. The FET is used as a rectifier, similarly to the secondary synchronous rectifier M of a flyback converter as illustrated in FIG. 1B. When the synchronous rectifier is turned on, a blanking time is added. By sensing $V_{DS}$ of the synchronous rectifier at the end of blanking time, the load condition is judged. If $V_{DS}$ is higher than a reference voltage, light load mode is determined and detected. If the light load condition is detected for several successive cycles or lasts for more than a predetermined period of time, the synchronous rectification function will be latched off. During latch-off period, if heavy load mode is detected for successive several cycles, the synchronous function will be active again.

The control method will be illustrated in detail with reference to the state diagram. The nodes of S0 to S4_C represent respectively as follows:

S0: startup, setting K=1;
S1: OFF state (no current flows through the rectifier);
S2_A: ON state in synchronous rectification (current flows mainly through the channel of the synchronous rectifier);
S2_B: ON state in non-synchronous rectification (current flows through the body diode of the synchronous rectifier);
S3_A and S3_B: sensing $V_{DS}$;
S4_A: setting K=1;
S4_B: holding on K;
S4_C: setting K=0.

Every cycle of the state diagram represents a cycle period of the rectification where in one cycle period, the rectifier or the body diode is ON and OFF each.

Here, K is a light load control signal where if K=1, it is in synchronous rectification for the next cycle and if K=0, it is in non-synchronous rectification for the next cycle. "ON state" of the synchronous rectifier means positive current begins to flow from its source to the drain. The ON state can be detected when the drain-source voltage $V_{DS}$ drops to a negative voltage below a reference voltage in one embodiment.

At node S0, the controller starts up, and K is set to 1 for entering into synchronous rectification for the next cycle. At node S1, no current flows through the rectifier, that is, the rectifier is in OFF state. When positive current flows through the body diode of the rectifier and $V_{DS}$<−70 mV, if K=1, the rectifier is turned on with high gate voltage $V_{GS}$ in synchronous way at node S2_A. If K=0, current flows through the body diode of the rectifier at node S2_B.

A blanking time of T is added at node S2_A and node S2_B. At the end of the blanking time T, $V_{DS}$ is sensed at node S3_A or S3_B. At node S3_A, $V_{DS}$ is compared with a reference voltage $V_{REF1}$. In one example, $V_{REF1}$=0. If $V_{DS}$>$V_{REF1}$, light load condition is detected, K remains HIGH for the beginning cycles at node S4_B. Only when light load condition lasts for several successive cycles or lasts for a time period of ΔT, such as 100 μs, K is set LOW at node S4_C to latch off synchronous rectification and the synchronous rectifier rectifies current through the body diode.

At node S3_B, $V_{DS}$ is compared with a reference voltage $V_{REF2}$. If $V_{DS}$<$V_{REF2}$, heavy load condition is determined. In one example, $V_{REF2}$=0V. K remains LOW for the first cycles at node S4_B. Only when the heavy load condition lasts for successive N cycles, K is set HIGH (K=1) at node S4_A, and the synchronous rectifier rectifies the current at node S2_A for the next cycle. In one example, N=16. In the typical embodiment, $V_{REF1}$=$V_{REF2}$.

In another embodiment, hysteresis control is used. The reference voltage $V_{REF1}$ adopted to be compared with $V_{DS}$ during synchronous rectification and the reference voltage $V_{REF2}$ adopted during non-synchronous rectification are at different levels. For example, $V_{REF1}$=0V, and $V_{REF2}$=−300 mV as illustrated in FIG. 3.

In yet another embodiment, the blanking time T1 during synchronous rectification and the blanking time T2 during latch-off period are different. In one embodiment, T1<T2.

After states S4_A, S4_B and S4_C, the rectifier is in OFF state at node S1. For synchronous rectification, if $V_{DS}$>−30 mV, the rectifier is turned off at S1, and for non-synchronous rectification, current decreases to zero at node S1.

Figure 4:
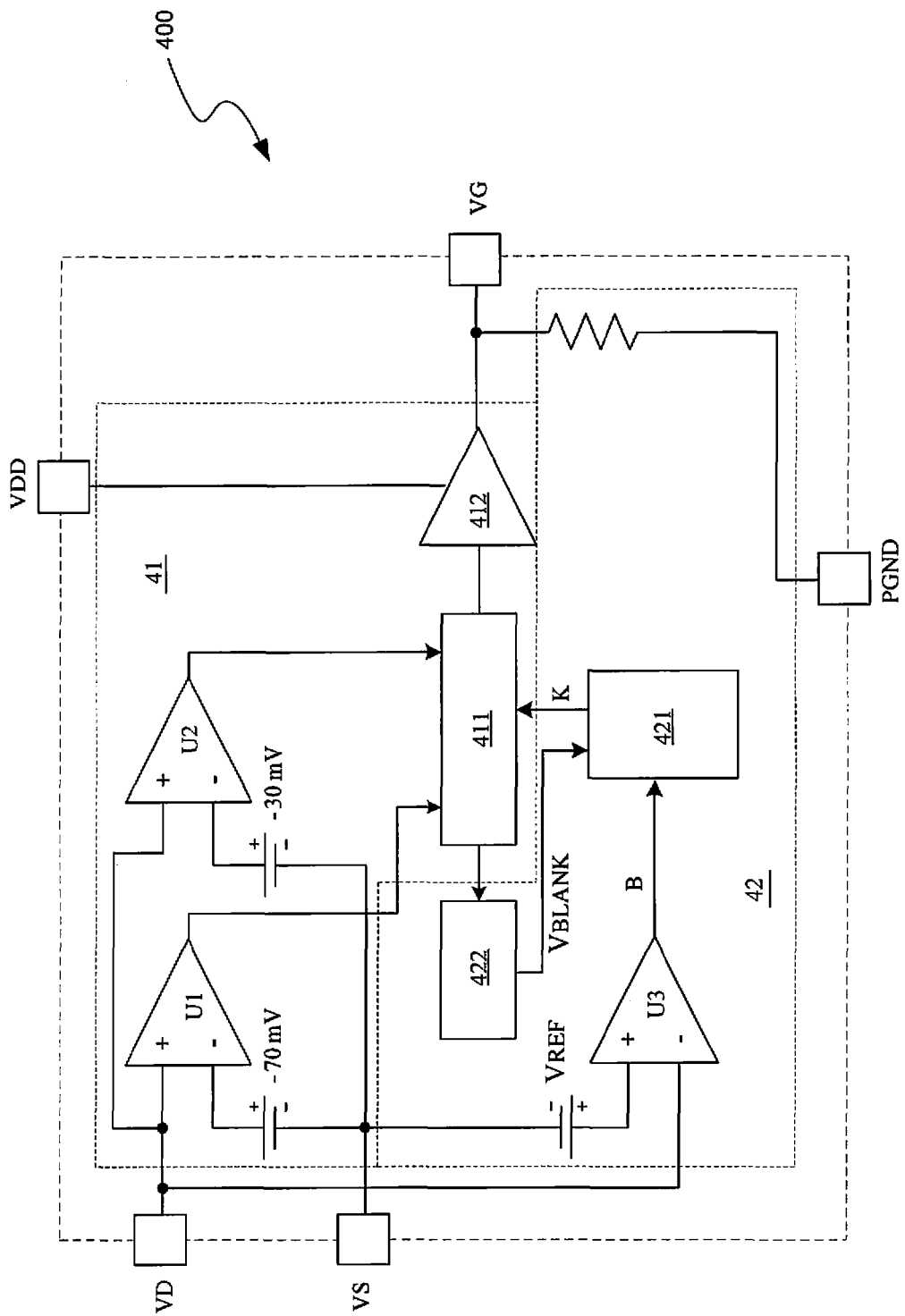
FIG. 4 shows a control circuit according to the control method in FIG. 3.

FIG. 4 shows a control circuit 400 according to the control method in FIG. 3. The control circuit 400 comprises external terminals of VD, VS, VG, VDD and PGND, which are connected to the drain of the rectifier, the source of the rectifier, the gate of the rectifier, the power supply of the control circuit 400 and the ground of the control circuit 400 respectively. The control circuit 400 comprises internally a conventional synchronous rectification circuit 41 for generating synchronous rectification signal and a light load control circuit 42 for latching off synchronous rectification during extended light load condition.

Figure 2:
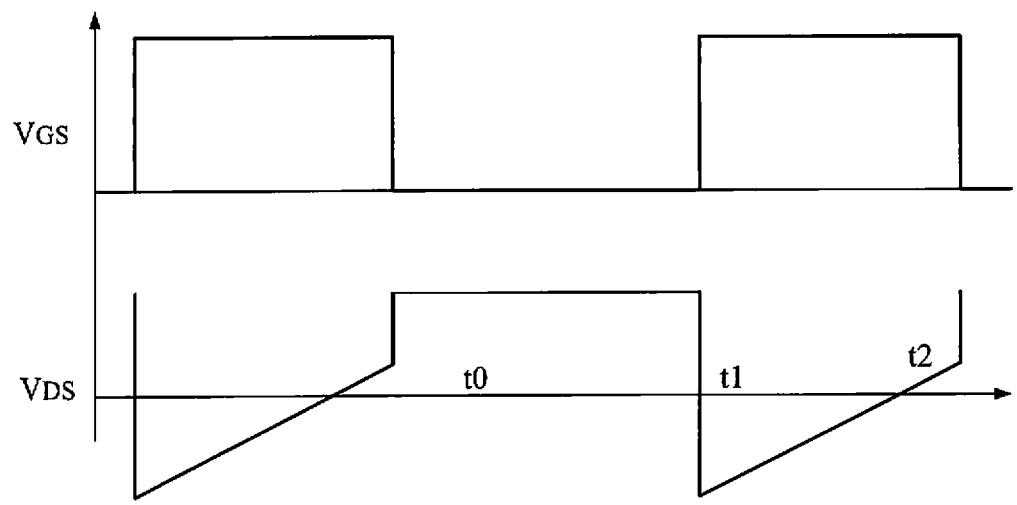
FIG. 2 shows a timing diagram illustrating the circuit of FIG. 1B.

In one embodiment, the synchronous rectification circuit 41 generates an interim synchronous rectification signal. In one typical example, the synchronous rectification signal is illustrated in form of $V_{GS}$ signal shown in FIG. 2. The synchronous rectification circuit 41 comprises in one embodiment a turn-on comparator U1 and a turn-off comparator U2. U1 is connected to the VD terminal at its non-inverting terminal and a reference signal (−70 mV as an example) at its inverting terminal. The comparator U2 is connected to the VD terminal at its non-inverting terminal and another reference signal (−30 mV as an example) at its inverting terminal. Comparator U1 is used to set the synchronous rectification signal HIGH and comparator U2 is used to set the synchronous rectification signal LOW.

The synchronous rectification circuit 41 further comprises in one embodiment the driving logic circuit 411 and the driving circuit 412. The driving logic circuit 411 receives at its inputs the output of U1, U2, and the light load control signal K from the light load control circuit 42. The driving logic circuit 411 puts out a driving signal to the driving circuit 412, and an ON signal to the light load control circuit 42. The ON signal represents the start of the positive current flowing through the rectifier. The driving circuit 412 puts out a gate control signal at the VG terminal. The driving logic circuit 411 further generates the interim synchronous rectification signal according to the output of U1 and U2.

Continuing with FIG. 4, the light load control circuit 42 latches off synchronous rectification during the extended light load condition. The light load control circuit 42 comprises a drain-source voltage comparator U3, a blanking time circuit 422 and a latching circuit 421. The comparator U3 compares $V_{DS}$ with a reference voltage $V_{REF}$. The inverting terminal of U3 is connected to the terminal VD, the non-inverting terminal receives a reference voltage $V_{REF}$. U3 puts out a signal B to the latching circuit 421. In one embodiment, $V_{REF}$=0V. The blanking time circuit 422 receives the ON signal from the driving logic circuit 411 and puts out a blanking signal $V_{BLANK}$ to the latching circuit 421. $V_{BLANK}$ is set HIGH at the start of the ON state of the rectifier. The HIGH level of $V_{BLANK}$ lasts time T. The latching circuit 421 puts out the light load control signal K to the driving logic circuit 411. In one embodiment, the driving logic circuit 411 comprises an AND gate where the inputs of the AND gate receives the light load control circuit K and the interim synchronous rectification signal. The output of the AND gate is connected to the driving circuit 412. When K=0, synchronous rectification is latched off. Then $V_{GS}$ is LOW for the next cycle and the rectifier entering into non-synchronous rectification. When K=1, the rectifier works under synchronous rectification for the next cycle.

Figure 5A:
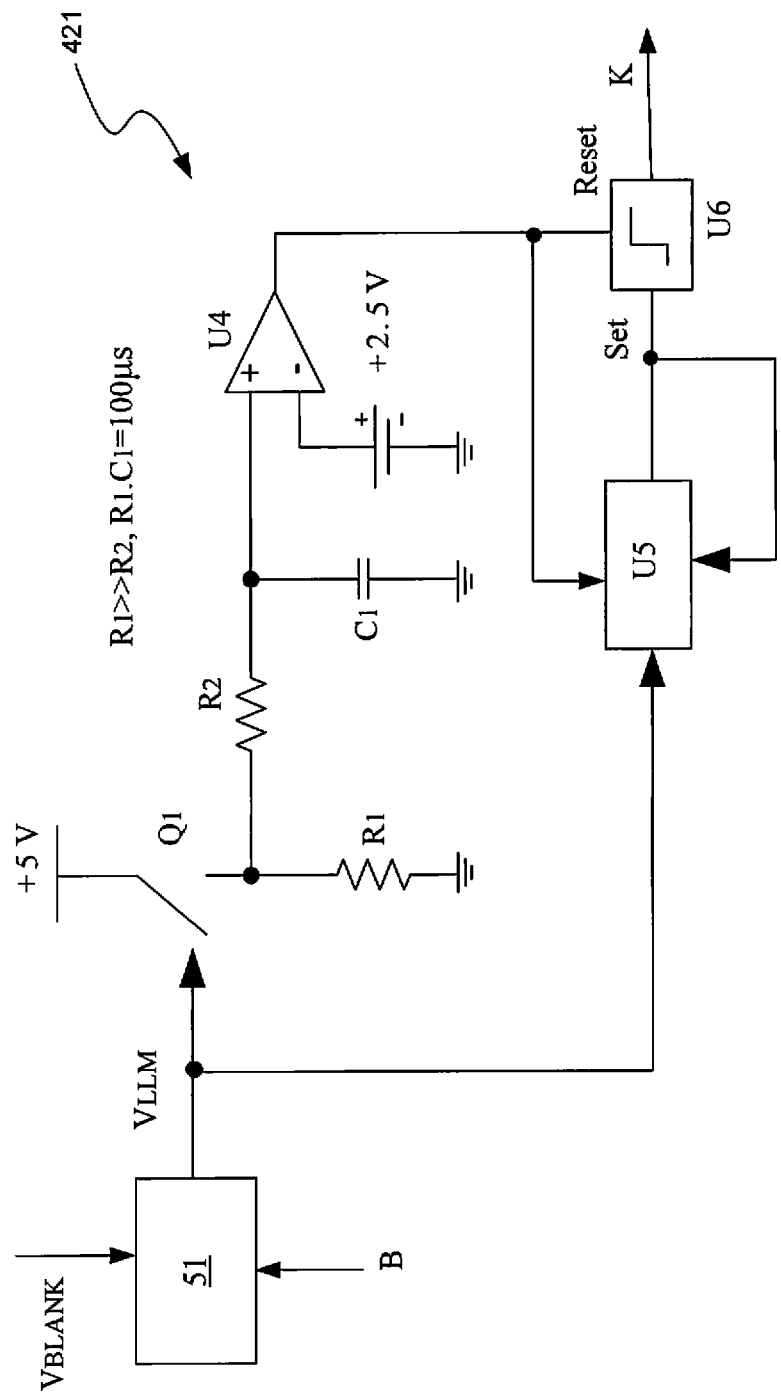
FIG. 5A shows a latching circuit of the control circuit shown in FIG. 4.

FIG. 5A shows an embodiment of the latching circuit 421. The latching circuit 421 comprises a light load logic circuit 51, a charging circuit comprised of the resistor $R_1$, $R_2$ and a capacitor $C_1$. The latching circuit 421 further comprises a switch Q1, a comparator U4, a counter U5 and a monostable trigger U6. The light load logic circuit 51 receives signal B from the drain-source voltage comparator U3 and $V_{BLANK}$ from the blanking time circuit 422, and puts out a load indication signal $V_{LLM}$.

Figure 5B:
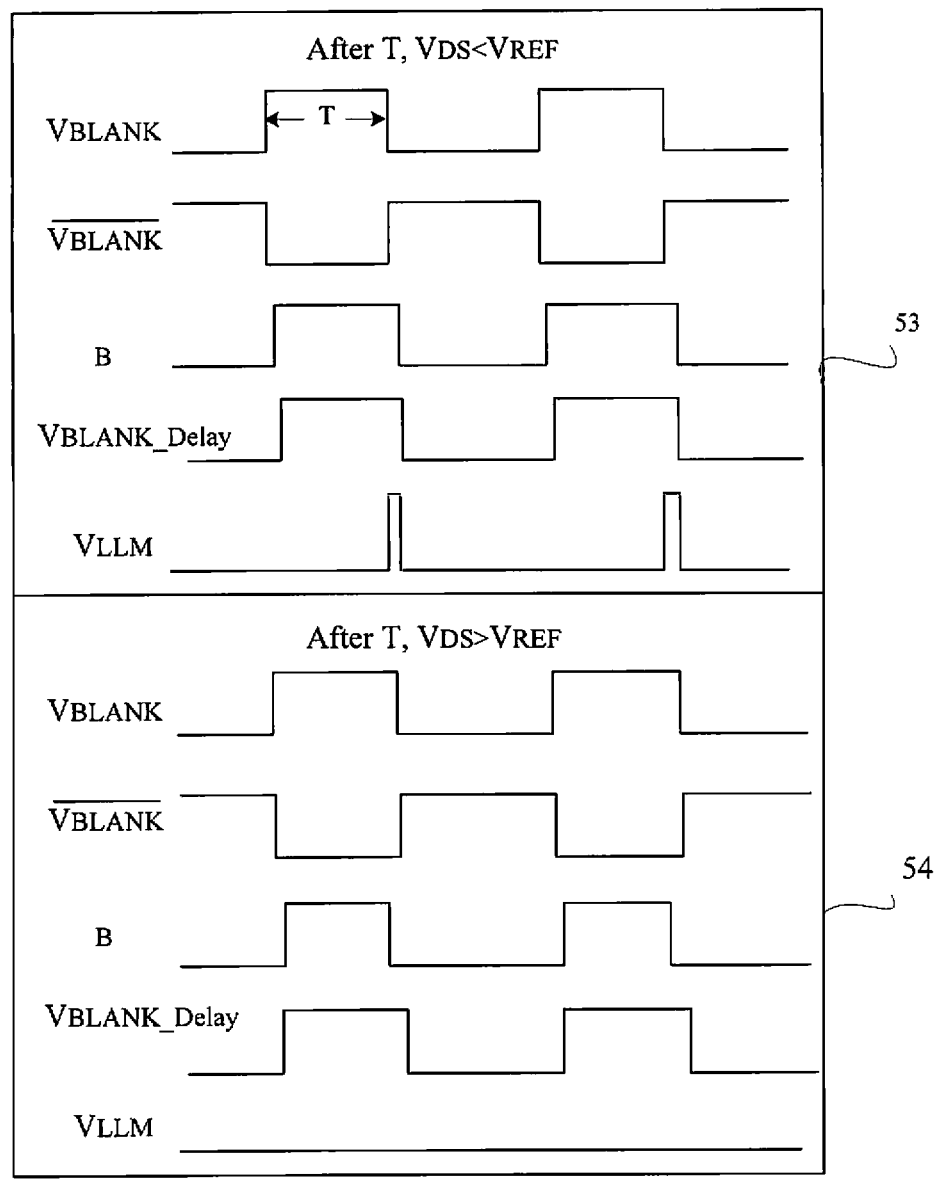
FIG. 5B shows a timing diagram of the light load logic circuit shown in FIG. 5A.

In one embodiment, the logic of the light load logic circuit 51 is shown in FIG. 5B illustrated by the waveforms. $V_{LLM}$ is determined by $V_{DS}$. The width of the blanking time signal $V_{BLANK}$ is T. In heavy load condition, at the falling edge of $V_{BLANK}$, $V_{DS}<V_{REF}$, B is HIGH, and $V_{LLM}$ present a positive pulse, referring to the upper diagram 53. During light load condition, $V_{DS}>V_{REF}$, B is LOW, and $V_{LLM}$ keeps LOW, referring to the bottom diagram 74. Thus, $V_{LLM}$ is determined by a function of: $V_{LLM}=B \times \overline{V_{BLANK}} \times V_{BLANK\_Delay}$, wherein $V_{BLANK\_Delay}$ has a same waveform as $V_{BLANK}$ but delays a predetermined short time. In one embodiment, the width of the positive pulse of $V_{LLM}$ is substantially less than one cycle.

Referring back to FIG. 5A, at the leading edge of $V_{LLM}$, $Q_1$ is turned on and $C_1$ is charged (to 5V as an example). Meanwhile, the counter U5 adds on 1 When $V_{LLM}$ is LOW, $Q_1$ is turned off, and $C_1$ is discharged through $R_1$ and $R_2$ wherein $R_1$ is substantially larger than $R_2$ and $R_1 * C_1 = \Delta T$. As a result, when $V_{LLM}$ keeps LOW for a time of $\Delta T$, $C_1$ is discharged below a reference voltage (2.5V as an example), then U4 puts out LOW and reset U6 (K=0). At the falling edge of K, the counter U5 is cleared and starts to count from 0. When $V_{LLM}$ presents successive positive pulse which exceeds a predetermined number, the counter U5 overflows and set U6 HIGH (K=1). Meanwhile, U5 is cleared when overflows.

Figure 6:
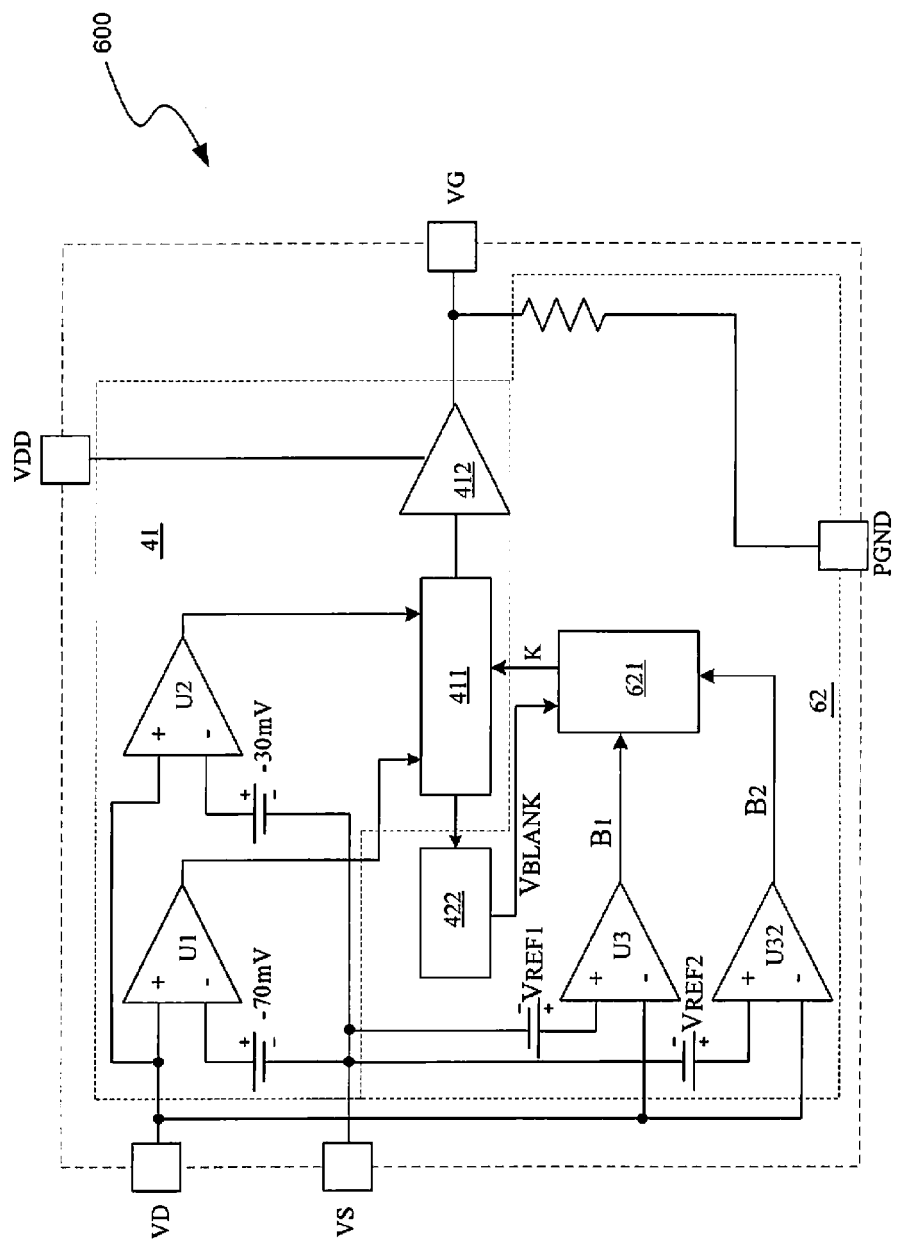
FIG. 6 shows a control circuit with hysteresis control.

FIG. 6 shows a control circuit 600 with hysteresis control according to one embodiment of the present invention. The control circuit 600 comprises a traditional synchronous rectification circuit 41 and a light load control circuit 62. Compared to the control circuit 400 as illustrated in FIG. 4, the control circuit 600 further comprises a second drain-source voltage comparator U32 besides the first drain-source voltage comparator U3. U3 is adopted to compare the drain-source voltage $V_{DS}$ with a first reference voltage $V_{REF1}$ and puts out a first signal $B_1$. U32 is adopted to compare $V_{DS}$ with a second reference voltage $V_{REF2}$ and puts out a second signal $B_2$. The non-inverting input of U32 receives a reference signal $V_{REF2}$. The inverting input of U32 is connected to the VD terminal. In one embodiment, $V_{REF1}=0$ mV and $V_{REF2}=-300$ mV.

Figure 7:
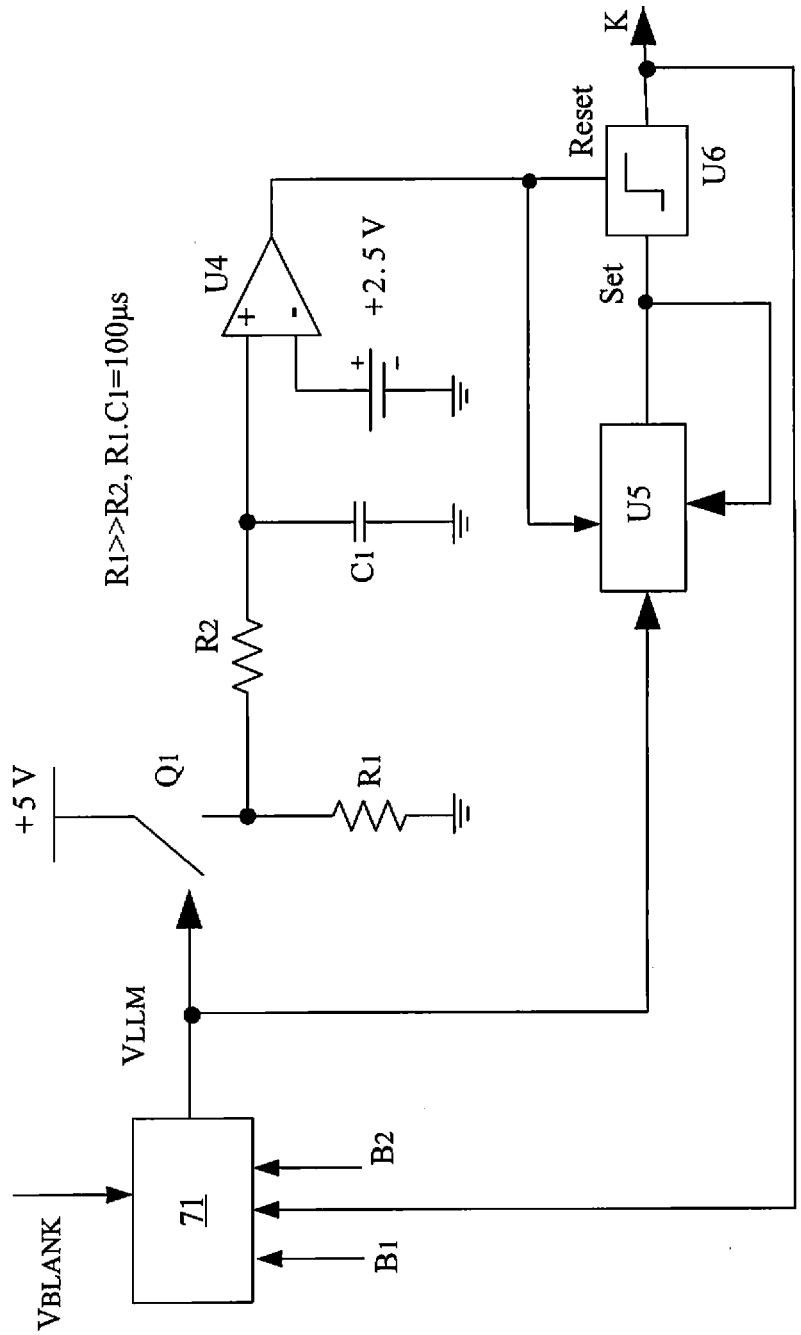
FIG. 7 shows the latching circuit of FIG. 6.

Referring to FIG. 7, U32 puts out a signal $B_2$ to the light load logic circuit 71 of the latching circuit 621. The load indication signal $V_{LLM}$ is determined by function of: $V_{LLM}=B_3 \times \overline{V_{BLANK}} \times V_{BLANK\_Delay}$, where $B_3 = K \times B_1 + \overline{K} \times B_2$. With this logic control, during synchronous rectification, $V_{DS}$ is compared to $V_{REF1}$ to detect the load condition and during non-synchronous rectification, $V_{DS}$ is compared to $V_{REF2}$ to detect the load condition.

In one embodiment, the rest of the latching circuit 621 is the same as illustrated for FIG. 5A. If K=0, the rectifier works under non-synchronous rectification for the next cycle, and if K=1, the rectifier works under synchronous rectification for the next cycle.

Note that the present invention is not confined to flyback converters, DC-DC converters or AC-DC converters, and it is also applicable to the other converters or systems having a rectifier.

Though "leading edge", "falling edge", "HIGH", "LOW", "less" or other relative verbs are used, it is obvious to the person skilled in the art that the present invention can also be fulfilled when the opposite logic is selected. Thus, features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A circuit comprising:
    a drain-source voltage comparator, coupled to a rectifier, said drain-source voltage comparator configured to compare the drain-source voltage of said rectifier to a first reference voltage;
    a blanking time circuit generating a blanking time signal;
    a light load logic circuit, coupled to said drain-source voltage comparator and said blanking time circuit and generating a load indication signal;
    a charging circuit comprising a capacitor, charged during a heavy load state of said load indication signal and discharged during a light load state of said load indication signal;
    a comparator comparing the charging circuit voltage with a second reference voltage; and
    a monostable trigger with an input coupled to an output of said comparator, and said monostable trigger configured to output a light load control signal to latch off synchronous rectification of said rectifier during synchronous rectification operation of said rectifier, if said load indication signal is a pattern for a predetermined time.

2. The circuit of claim 1, wherein said pattern is a pulse in each cycle.

3. The circuit of claim 2, wherein said load indication signal presents a pulse if the drain-source voltage is higher than said first reference voltage at the falling edge of said blanking time signal.

4. The circuit in claim 1, wherein during non-synchronous rectification of said rectifier, if said load indication signal presents a second pattern, said rectifier returns to synchronous rectification.

5. The circuit of claim 4, wherein said second pattern is logic LOW.

6. A controller for controlling a rectifier, comprising:
    a synchronous rectification circuit generating a synchronous rectification signal for synchronous rectification of said rectifier; and
    a light load control circuit receiving the drain-source voltage of said rectifier to judge load condition, and generating a light load control signal to selectively latch off synchronous rectification into non-synchronous rectification when light load condition is detected for successive cycles, wherein said light load control circuit comprises:
        a drain-source voltage comparator comparing said drain-source voltage with a first reference voltage;
        a blanking time circuit with input coupled to said synchronous rectification circuit; and
        a latching circuit comprising:
            a light load logic circuit, with a plurality of inputs coupled respectively to an output of said drain-source voltage comparator and to an output of said blanking time circuit, and outputting a load indication signal;
            a charging circuit comprising a capacitor, charged during a heavy load state of said load indication signal and discharged during a light load state of said load indication signal;

a comparator comparing the charging circuit voltage with a third reference voltage; and a monostable trigger with an input coupled to an output of said comparator of said latching circuit, and said monostable trigger configured to output the light load control signal.

7. The controller of claim 6, wherein during non-synchronous rectification, when a heavy load is detected for a number of successive cycles, said rectifier returns to synchronous rectification.

8. The controller of claim 6, wherein said light load control circuit latches off synchronous rectification when said light load control signal is HIGH and controls said rectifier back to synchronous rectification when said light load control signal is LOW.

9. The controller of claim 6 wherein said first reference voltage is 0 mV.

10. The controller of claim 6 wherein said latching circuit further comprises a counter receiving said load indication signal, and wherein said monostable trigger is set HIGH when the counter reaches a trigger, and wherein said monostable trigger is set LOW by said comparator of said latching circuit.

11. The controller of claim 10, wherein said counter increments when said load indication signal presents the heavy load condition for that cycle.

12. The controller of claim 10, wherein said load indication signal presents a positive pulse when the heavy load condition is detected and keeps LOW when the light load condition is detected.

13. The controller of claim 6, wherein said light load control circuit further comprises a second drain-source voltage comparator, said second drain-source voltage comparator comparing said drain-source voltage of said rectifier to a second reference voltage and with outputs connected to said light load logic circuit.

14. The controller of claim 13, wherein said second reference voltage is less than said first reference voltage.

15. A control method for controlling a rectifier comprising:
comparing the drain-source voltage of said rectifier with a first reference voltage and generating a first comparison signal;
generating a first blanking time signal;
generating a load indication signal based on said first comparison signal and said first blanking time signal;
charging a capacitor during a heavy load state of said load indication signal and discharging said capacitor during a light load state of said load indication signal;
comparing the charging circuit voltage with a third reference voltage and generating a third comparison signal;
generating a light load control signal with a monostable trigger based on said third comparison signal; and
during synchronous rectification, if light load condition is detected for several successive cycles, latching off synchronous rectification into non-synchronous rectification.

16. The control method of claim 15, wherein said several successive cycles exceeds a predetermined time.

17. The control method of claim 16, wherein said predetermined time is 100 μS.

18. The control method of claim 15, wherein during non-synchronous rectification, if a heavy load condition is detected for several number of successive cycles, controlling said rectifier back to synchronous rectification.

19. The control method of claim 18, wherein said light load condition during synchronous rectification is detected when the drain-source voltage of said rectifier is higher than the first reference voltage after the first blanking time from the ON state of said rectifier, and said heavy load condition during non-synchronous rectification is detected when the drain-source voltage of said rectifier is less than a second reference voltage after a second blanking time from the ON state of said rectifier.

20. The control method of claim 19, wherein said first reference voltage is higher than said second reference voltage.

21. The control method of claim 20, wherein said first reference voltage is 0 mV and said second reference voltage is −300 mV.

22. The control method of claim 19, wherein said first blanking time is less than said second blanking time.

23. The control method of claim 19, wherein said first reference voltage is equal to said second reference voltage and said first blanking time is equal to said second blanking time.

* * * * *